April 10, 1962 D. F. CHRISTY 3,028,679
GEOMETRICAL INSTRUMENT
Filed Aug. 27, 1959

INVENTOR.
Donald F. Christy
BY
Murray, Sackhoff & Murray
ATT'YS

United States Patent Office 3,028,679
Patented Apr. 10, 1962

3,028,679
GEOMETRICAL INSTRUMENT
Donald F. Christy, 519 Congress St., Ottawa, Ill.
Filed Aug. 27, 1959, Ser. No. 836,358
3 Claims. (Cl. 33—215)

The present invention relates to improvements in geometrical instruments especially useful by carpenters and builders, the invention having as its principal object to provide a device of said character capable, by reason of its rugged yet simplified form and novel arrangement of parts, as an ideal article of manufacture combining in a single instrument a level, a carpenter's square, a rule, and a protractor.

Another object of the invention is to provide a combination instrument that is a gravity operated level giving very accurate readings when used in a vertical position and which also serves as a layout device for marking or scribing rafters and sheet metal work, respectively, when it is used in a horizontal position.

Other objects will become apparent from the following specification taken in conjunction with the accompanying drawing, illustrating a preferred form of my invention, wherein.

Figure 1:
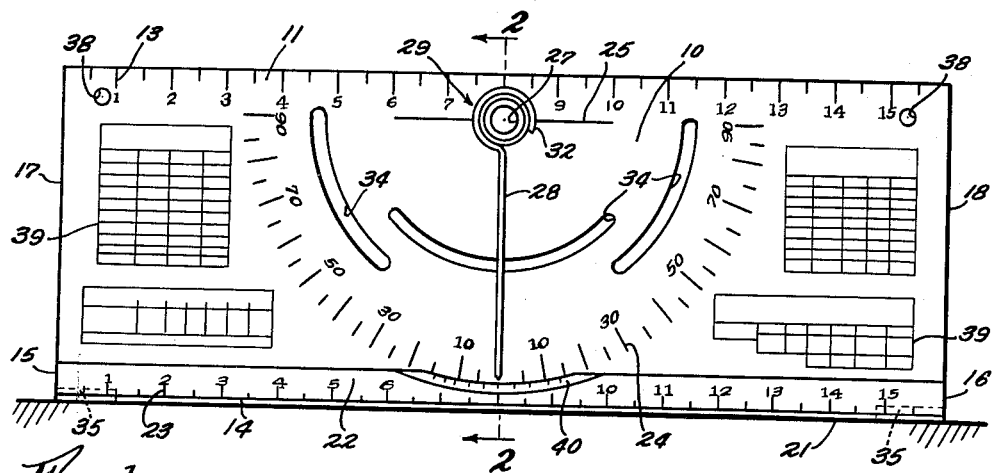
FIG. 1 is a front elevational view of my geometrical instrument positioned on an object and illustrating the use of the instrument as a gravity operated level and/or pitch or slope measuring device for that object.

With reference to the drawings wherein like reference characters designate corresponding parts, my instrument comprises a flat protractor body 10 illustrated as having a rectangular formation, said body being preferably made of a transparent, plastic material, the longitudinal marginal portions 11 and 12 of the body providing relative parallel and straight edges. The marginal portion 11 is graduated at 13 in the English linear scale and is capable of being used for ruling and/or measuring, as required. A base 14 is secured to the front face of the protractor body 10 along the marginal portion 12 thereof, said base being co-extensive with said portion and having terminal end faces 15 and 16 lying in planes normal to the body of the protractor; each plane containing the lateral marginal edges 17 and 18, respectively, of the body.

Figure 4:
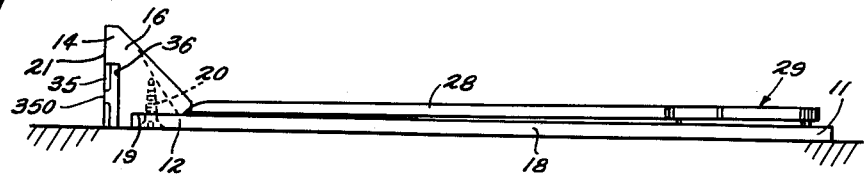
FIG. 4 is a side view of my instrument showing it in a horizontal position on a surface in a typical position for layout work.
Figure 2:
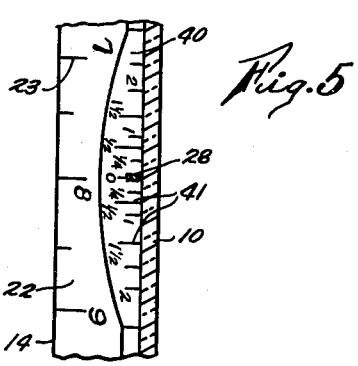
FIG. 2 is an enlarged section taken on line 2—2 of FIG. 1.

As best shown in FIGS. 2 and 4 the rear face of the base is recessed at 19 to receive the marginal portion 12 of the body 10; screws 20, countersunk in the rear face of the body and threaded in the base, being suitably employed to secure the base rigidly to the protractor body. The bottom planar face 21 of the base is disposed at right angles to the protractor body and is parallel to the marginal portion 12 thereof, whilst the inclined, hypotenuse face 22 of the base is disposed at an angle of substantially 60° with the plane of the protractor body 10. The reference numeral 23 indicates graduations in the English linear scale corresponding to the graduations 13 in the marginal portion 11 of the protractor body, said graduations 23 being useful in making readings and other measurements when it is necessary by reason of the position of the object to be measured to sight along the marginal edge portion 11 of the protractor body.

Protractor graduations 24 are inscribed or otherwise marked on the body 10 wherein the 0° mark is centrally disposed and degree graduations increase by regular increments from 0° to 90° on both sides of the 0° mark. With reference to FIG. 1 it will be seen that the 0° mark coincides with the 8″ marks on the linear scales 13 and 23 which are located at about the longitudinal center of the protractor body. The body has inscribed or otherwise marked thereon a sight line 25 which is located across the central part of the body and is aligned with the opposed 90° graduations on the protractor scale 24. The sight line is also parallel to and adjacent the marginal portion 11 of said body. At the intersection of the sight line 25 with the lateral extension of the 0° mark on the scale 24 a hole 26 is formed in the body for receiving a hollow mounting stud 27 for a pointer arm 28, said pointer arm extending radially outwardly from the stud to and across the protractor scale 24. The stud is perpendicular to the protractor body 10 and has a rear edge spun into and flush with the rear surface of the body to form a rigid mounting means for the stud on the body. To preclude binding of the arm 28 on the protractor body when the instrument is stood on edge for use as a level and to provide for limited lateral pivotal movement of the free end of the arm up against the body when the instrument is placed in a horizontal position for use as a layout device, the arm 28 is rotatably and pivotally mounted on the stud by means of a ball bearing generally indicated in the drawings by the numeral 29.

Figure 3:
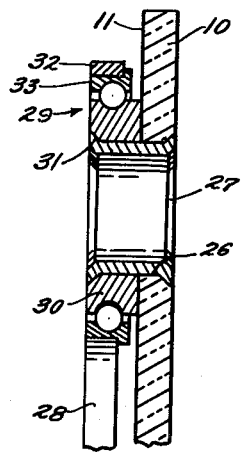
FIG. 3 is a fragmental and greatly enlarged detail view of the ball bearing mounting for the gravity operated indicator arm on the body of the instrument.
Figure 5:
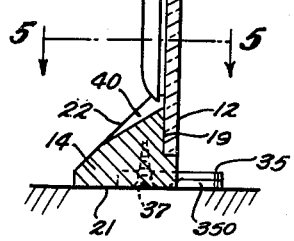
FIG. 5 is a fragmental section taken on line 5—5 of FIG. 2.

As best shown in FIG. 3 the inner race 30 of the ball bearing is fixed against the outer face of the protractor body by spinning the outer edge of the stud into a peripheral groove 31 formed in the inner race whilst the pointer 28 is formed with a circular upper end 32 which encircles and grips the exterior annular surface of the outer bearing race 33.

The ball bearing is for all practical purposes frictionless whereby the pointer 28 may be suspended in a vertical position under the influence of gravity to give accurate readings when the instrument is used as a level or a pitch or slope measuring device in the manner illustrated in FIGS. 1 and 2 of the drawing. The ball bearing races also have some limited lateral movement by reason of the fact that the circular row of balls are loosely held between the outer and inner races of the bearing and this relative lateral movement between the races is advantageously utilized in my instrument to permit the free end of the pointer 28 to be pivoted laterally on the bearing so that its free end may come into contact with the outer surface of the protractor body when the instrument is used as a layout device in the horizontal position indicated in FIG. 4, whereby the pointer 28 may be manually moved to the proper graduation and then held up against the body by the hand while a proper mark is made on the work through one of the overlapping arcuate slots 34 formed in the protractor body.

Figure 6:
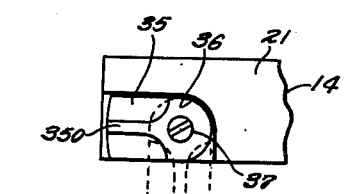
FIG. 6 is a fragmental, plan view of the underside of the base of the instrument showing a pivoted supporting foot for the device.

With particular reference to FIGS. 2, 4 and 6 it will be noted that a foot 35 is pivotally mounted in a recess 36 formed in the planar bottom 21 at each end of the base 14; the foot having a central rib 350 on its outer end which is flush with the planar bottom 21 of the base. The foot is pivotally mounted in the recess by a screw 37 which extends through a hole in the body of the foot and is threaded in the base. When the instrument is used as a layout device (FIG. 4) the foot 35 is located entirely within the recess 36 in the base but when, as indicated in FIG. 2, it is desired to stand the instrument on edge on an object for use, for example, as a level, the foot 35 may be moved out of the recess so that it extends rearwardly from the base to form a stand for the instrument upon the object to be measured so that the carpenters' or builders' hands are free for use on the work.

Now referring to FIG. 1 it will be noted that the protractor body has a hole 38 formed within each upper corner portion thereof, each hole being an equal distance from the edge portion 11. Identical S-hooks (not shown) may be engaged in the holes 38 and have their upper parts hooked over a piece of work so that the instrument may be hung from an object to determine its inclination whilst leaving the workman's hands free to adjust said object. It is also contemplated that a number of useful tables 39 may be inscribed or otherwise marked on the protractor body 10 such as a table translating inches slope per foot into readings in degrees, a table for laying out regular polygons on horizontal or sloping surfaces, a table to lay out rafters showing the pitch of rafters translated into the plumb end and plate end readings in degrees, and a table to draw regular polygons on vertical surfaces.

One of the uses of the instrument is as a level (FIGS. 1 and 2) to determine whether an object is actually level, or if it slopes, the exact amount of such slope. Thus to determine or establish the slope of a floor, terrace, ditch, driveway or roof the small feet 35 are pivoted outwardly so that when the instrument is placed upright on an object it will have great stability and will not require the use of hands to maintain it in measuring position. When the gravity operated pointer has come to rest, the degree marking on the protractor scale 24 where the pointer has come to rest is read directly. In some locations it is very difficult to read the instrument from its front face and to this end an arcuate face 40 is formed centrally in the base 14 and a set of calibrations 41 are marked thereon which indicate the inches of slope per foot of the object upon which the instrument is set.

When the instrument is used as a layout tool (FIG. 4) the small feet 35 are positioned within the recesses 36 and the instrument is laid upon a horizontal piece of work or layout sheet. The bearing sight hole 27 is then centered on the point from which a measurement is to be taken and the pointer 28 is then manually moved to the desired angle and held against the outer face of the protractor body by the hand whilst a mark is made with the aid of the pointer on the work or sheet through the appropriate arcuate slot 34. Then using the straight edge of the instrument a line is drawn joining together the place marked and the point from which the measurement was taken.

Only two exemplary uses of the instrument have been set forth but many other uses and advantages of the instrument will be apparent to those skilled in the art and I wish it to be understood that the embodiment of the invention here is illustrated only and is not intended as definitive of the scope of the invention, reference being had for this purpose to the appended claims.

What is claimed is:

1. An instrument of the character described comprising a flat body having a straight edge portion, a sight line on the body parallel to the straight edge portion, a protractor scale on the body and having its center lying in the sight line, said scale having a central 0° mark and graduations on each side thereof increasing to 90°, said 90° marks lying in and on each side of the sight line, a hole formed in the body at the intersection of the sight line and the extension of the 0° mark on the protractor scale, a hollow stud passing through the hole and positioned perpendicular on the body, a ball bearing having an inner race fixed on the body by the stud, a pointer, and means on one end of the pointer for securing it to the outer race of the bearing, the races of said ball bearing having limited lateral movement whereby when the instrument is stood edgewise in a vertical position the pointer will be spaced from the body for free swinging movement on the stud and when the instrument is in a horizontal position the outer end of the pointer will be free to move into contact with the body.

2. An instrument of the character described comprising a rectangular, flat body having parallel straight edge portions, a sight line marked on the body adjacent and parallel to one straight edge portion, a protractor scale marked on the body with its center lying centrally in the sight line, said scale having a central zero mark and graduations on both sides of the zero mark increasing therefrom to 90°, said 90° marks lying in the end extensions of the sight line, a hole formed in the body at the intersection of the sight line and the extension of the zero degree mark of the protractor scale, a stud mounted on the body through the hole and positioned perpendicular on the body, a ball bearing having an inner race fixed on the body by the stud, and an outer race rotatable around the inner race, a pointer having an end mounted on the outer race and a straight portion extending from said end with the free end of the pointer overlying the protractor scale, and scribing slots formed through the body and positioned between the protractor scale and the stud, the races of said ball bearing having limited lateral movement whereby when the instrument is disposed in a vertical position the pointer will be spaced from the body for free swinging movement and when the instrument is in a horizontal position the pointer may be moved laterally on the bearing so that its free end may be moved into scribing contact with the body.

3. An instrument as set forth in claim 2 characterized by the fact that there are a plurality of arcuate scribing slots formed through the body each concentric with the stud and disposed on different radii of the stud in angular overlapped positions.

References Cited in the file of this patent

UNITED STATES PATENTS

| | | |
|---|---|---|
| 423,090 | Smith | Mar. 11, 1890 |
| 2,054,420 | Hochman | Sept. 15, 1936 |
| 2,567,653 | Ruhland | Sept. 11, 1951 |
| 2,632,958 | DeMasters | Mar. 31, 1953 |
| 2,752,692 | Smith | July 3, 1956 |